(12) United States Patent
Pfau et al.

(10) Patent No.: US 8,583,385 B2
(45) Date of Patent: *Nov. 12, 2013

(54) THERMAL, FLOW MEASURING DEVICE

(75) Inventors: Axel Pfau, Arlesheim (CH); Vivek Kumar, Muttenz (CH); Anastasios Badarlis, Birsfelden (CH)

(73) Assignee: Endress + Hauser Flowtec AG, Reinach (CH)

( * ) Notice: Subject to any disclaimer, the term of this patent is extended or adjusted under 35 U.S.C. 154(b) by 338 days.

This patent is subject to a terminal disclaimer.

(21) Appl. No.: 12/926,040

(22) Filed: Oct. 22, 2010

(65) Prior Publication Data

US 2011/0098944 A1  Apr. 28, 2011

(30) Foreign Application Priority Data

Oct. 23, 2009 (DE) .......................... 10 2009 045 958

(51) Int. Cl.
  *G01F 1/68* (2006.01)
(52) U.S. Cl.
  USPC ............................ 702/47; 73/204.11; 702/130
(58) Field of Classification Search
  CPC ............ G01F 1/69; G01F 1/684; G01F 1/36; G01F 15/22; G01F 15/61
  USPC ......... 702/45, 47, 49, 50, 100, 104, 130, 136, 702/182–185; 73/204.11, 204.25, 861.12
  See application file for complete search history.

(56) References Cited

U.S. PATENT DOCUMENTS

| | | | |
|---|---|---|---|
| 4,932,268 A * | 6/1990 | Hafner | 73/861.12 |
| 8,010,312 B2 * | 8/2011 | Hocker | 702/137 |
| 8,200,450 B2 * | 6/2012 | Hocker | 702/104 |
| 2004/0025584 A1 | 2/2004 | Akamatsu | |
| 2011/0098943 A1 * | 4/2011 | Pfau et al. | 702/47 |

FOREIGN PATENT DOCUMENTS

| | | |
|---|---|---|
| DE | 32 14 359 A1 | 12/1982 |
| EP | 0 024 327 | 3/1981 |
| FR | 2 161 834 | 7/1973 |
| FR | 2 246 846 | 5/1975 |
| GB | 2 210 983 A | 6/1989 |
| JP | 2006-284321 | 10/2006 |
| WO | WO 2008/104666 A2 | 9/2008 |

* cited by examiner

*Primary Examiner* — John H Le
(74) *Attorney, Agent, or Firm* — Bacon & Thomas, PLLC

(57) ABSTRACT

Thermal, flow measuring device and method for operating a thermal, flow measuring device. The thermal, flow measuring device has a first sensor with a first heatable resistance thermometer and at least an additional, second sensor with a second heatable resistance thermometer; wherein a decision coefficient is calculated according to the formula $DC=(PC_1-PC_2)/PC_1$, with $PC_1(t=t_1)=P_{1,1}(t_1)/(T_{1,heated;actual}(t=t_1)-T_{medium;actual}(t=t_1))$ and $PC_2(t=t_2)=P_{2,2}(t_2)/(T_{2,heated;actual}(t=t_2)-T_{medium;actual}(t=t_2))$, with P being the heating powers consumed by the corresponding resistance thermometers at the points in time t, and T being the temperature values; wherein the value of the decision coefficient indicates the flow direction of a measured medium in the measuring tube.

7 Claims, 3 Drawing Sheets

THERMAL, FLOW MEASURING DEVICE

TECHNICAL FIELD

The present invention relates to a thermal, flow measuring device and to a method for registering with the thermal, flow measuring device the flow and the flow direction of a measured medium in a measuring tube, wherein the thermal, flow measuring device has a first heatable resistance thermometer in a first shell housing end section, and a second heatable resistance thermometer in a second shell housing end section.

BACKGROUND DISCUSSION

Conventional thermal, flow measuring devices usually use two temperature sensors which are embodied as equally as possible, and which are arranged in (most often pin-shaped) metal shell housings—so-called stingers—and which are in thermal contact with the medium flowing through a measuring tube or through the pipeline. For industrial application, the two temperature sensors are usually installed in a measuring tube; the temperature sensors can, however, also be installed directly in the pipeline. One of the two temperature sensors is a so-called active temperature sensor, which is heated by means of a heating unit. As the heating unit, either an additional resistance heating is provided, or the temperature sensor itself is a resistance element—e.g. an RTD (Resistance Temperature Device) sensor—which is heated through conversion of electrical power, e.g. through a corresponding variation in the electrical measuring current. The second temperature sensor is a so-called passive temperature sensor; it measures the temperature of the medium.

In a thermal, flow measuring device, the heatable temperature sensor is usually heated in such a way, that a fixed temperature difference arises between the two temperature sensors. Alternatively, it is also known to supply a constant heating power via a control unit.

If there is no flow in the measuring tube, an amount of heat which is constant in time is then required for maintaining the predetermined temperature difference. If, in contrast, the medium to be measured is in movement, the cooling of the heated temperature sensor is essentially dependent on the mass flow of the medium flowing past. Since the medium is colder than the heated temperature sensor, heat from the heated temperature sensor is transported away by the flowing medium. In order to then maintain the fixed temperature difference between the two temperature sensors in the case of a flowing medium, an increased heating power is required for the heated temperature sensor. The increased heating power is a measure for the mass flow, e.g. mass flow rate, of the medium through the pipeline.

If, in contrast, a constant heating power is fed in, the temperature difference existing between the two temperature sensors as a result of the flow of the medium is lessened. The particular temperature difference is then a measure for the mass flow of the medium through the pipeline or through the measuring tube.

There is, thus, a functional relationship between the heating energy needed for heating the temperature sensor and the mass flow through a pipeline or through a measuring tube. The dependence of the so-called heat transfer coefficient on the mass flow of the medium through the measuring tube or through the pipeline is utilized in thermal, flow measuring devices for determining the mass flow. Devices which operate according to this principle are available from the assignee under the names "t-switch", "t-trend" and "t-mass".

Until now, mainly RTD-elements with helically wound, platinum wires were applied in thermal, flow measuring devices. In the case of thin-film, resistance thermometers (TFRTDs), a meander-shaped, platinum layer is conventionally vapor-deposited onto a substrate. Over this is applied a further, glass layer, for protecting the platinum layer. The cross section of thin-film, resistance thermometers is rectangular, in contrast to RTD elements, which have a round cross section. The heat transfer into the resistance element and/or from the resistance element accordingly occurs via two oppositely lying surfaces, which together make up a large part of the total surface of a thin-film, resistance thermometer.

EP 0 024 327 and U.S. Pat. No. 4,083,244 show different embodiments of thermal, flow measuring devices. These can also ascertain flow direction. In this regard, flow-conditioning bodies are arranged in the flow in front of a temperature sensor.

SUMMARY OF THE INVENTION

An object of the invention is to provide a thermal, flow measuring device, with which the flow direction of the measured medium is easily ascertainable.

The object is achieved by a thermal, flow measuring device for registering flow and flow direction of a measured medium through a measuring tube with a first heatable resistance thermometer in a first housing end section and a second heatable resistance thermometer in a second housing end section, wherein the first and the second housing end sections are arranged in the measuring tube in such a way, that a directional component of the first housing end section points in a first direction of the measuring tube axis, and that a second directional component of the second housing end section points in a second direction of the measuring tube axis, which is different from the first direction.

In a first further development, the thermal, flow measuring device has a first sensor and at least an additional, second sensor, wherein, in a first housing end section of a first housing, the first sensor has a first heatable resistance thermometer, and wherein, in a second housing end section of a second housing, the second sensor has a second heatable resistance thermometer; wherein the first housing is secured at a first housing shank in a sensor holder, and wherein the second housing is secured at a second housing shank in a sensor holder; wherein the first housing has at least a first bend between the first housing shank and the first housing end section; wherein a directional component of the first housing end section points in a first direction of the measuring tube axis; and wherein the second housing has at least a second bend between the second housing shank and the second housing end section, wherein a directional component of the second housing end section points in a second direction of the measuring tube axis.

In an additional further development, the first bend of the first housing and/or the second bend of the second housing have/has an angle of 90°. In this way, at least one housing end section points in the direction of the measuring tube axis; that is to say, an imaginary central axis of the housing end section is parallel to the measuring tube axis. Especially, the first housing end section of the first housing and/or the second housing end section of the second housing lie/lies in the measuring tube axis.

Another further development provides that the first housing shank of the first housing and/or the second housing shank of the second housing are/is perpendicular to the measuring tube axis, i.e. an imaginary central axis of a housing shank coincides with a radius of the measuring tube.

In an additional further development, the thermal, flow measuring device includes a third sensor for measuring the temperature of the measured medium. This is arranged in the measuring tube, for example, between the first sensor and second sensor and/or includes a third resistance thermometer in a pin-shaped third housing, which, for example, is arranged in such a manner, that it intersects the measuring tube axis approximately perpendicularly.

The object of the invention is achieved furthermore by a method for registering the flow and the flow direction of a measured medium in a measuring tube by means of a thermal, flow measuring device of the invention, wherein the thermal, flow measuring device has a first heatable resistance thermometer and at least a second heatable resistance thermometer, wherein measured values representing the temperature of the measured medium $T_{medium;actual}(t)$ are measured at the points in time $t=t_0, t_1, t_2, t_3, \ldots t_n$, with n being a natural number. The measured values representing the temperature of the measured medium—and thus the temperature of the measured medium—can, for example, be measured by the first, second or third sensor, depending on the embodiment of the thermal, flow measuring device. In such case, furthermore, a first instantaneous heating power $P_{1,1}(t_1)$ is consumed at a first point in time by the first heatable resistance thermometer, wherein a second instantaneous heating power $P_{2,2}(t_2)$ is consumed at a second point in time at the second heatable resistance thermometer, wherein the first heatable resistance thermometer provides a first measured value of the temperature $T_{1,heated;actual}(t=t_1)$ at the first point in time, and a first coefficient $PC_1(t=t_1)$ representing the flow of the measured medium through the measuring tube is calculated as a function of the heating power $P_{1,1}(t_1)$ consumed by the first resistance thermometer, the temperature of the measured medium $T_{medium;actual}(t_1)$ and the temperature of the first heatable resistance thermometer $T_{1,heated;actual}(t_1)$, e.g. according to the formula $PC_1(t=t_1)=P_{1,1}(t_1)/(T_{1,heated;actual}(t=t_1)-T_{medium;actual}(t=t_1))$, wherein the second heatable resistance thermometer provides a second measured value of the temperature $T_{2,heated;actual}(t=t_2)$ at the second point in time $t_2$, and a second coefficient $PC_2(t=t_2)$ is calculated as a function of the heating power $P_{2,2}(t_2)$ consumed by the second resistance thermometer, the temperature of the measured medium $T_{medium;actual}(t_2)$ and the temperature of the second heatable resistance thermometer $T_{2,heated;actual}(t_2)$, e.g. according to the formula $PC_2(t=t_2)=P_{2,2}(t_2)/(T_{2,heated;actual}(t=t_2)-T_{medium;actual}(t=t_2))$, and wherein a decision coefficient is calculated as a function of the first coefficient $PC_1(t_1)$ and the second coefficient $PC_2(t_2)$, e.g. according to the formula $DC=(PC_2-PC_1)/PC_2$, wherein the value of the decision coefficient indicates a flow of the measured medium in the measuring tube in a first direction, especially a direction parallel to the measuring tube axis, when the value the decision coefficients lies above a fixed limit value, and wherein the value of the decision coefficient indicates a flow the measured medium in the measuring tube in a second direction, again a direction parallel to the measuring tube axis, when the value of the decision coefficients lies below the fixed limit value, wherein the second direction points opposite to the first direction.

In a first further development of the method of the invention, the measured value of the temperature of the measured medium $T_{medium;actual}(t_1)$ at the first point in time is made available by the second heatable resistance thermometer or by the second sensor, and/or the measured value of the temperature of the measured medium $T_{medium;actual}(t_2)$ at the second point in time is measured by the first heatable resistance thermometer or the first sensor. Alternating heating periods are thus involved. The points in time $t_1$ and $t_2$ are thus especially different from one another, i.e. the first point in time and the second point in time are different points in time.

In another example, the measured value of the temperature of the measured medium $T_{medium;actual}(t)$ at the points in time t—thus especially at the first point in time $t_1$ and at the second point in time $t_2$—is measured by an additional temperature sensor, especially by a third resistance thermometer. The first resistance thermometer and the second resistance thermometer can then, at least for a short time interval, simultaneously be heated, and the points in time $t_1$ and $t_2$ can be equal, wherein, in an additional further development of the invention, the second heating power $P_{2,2}(t_2)$ consumed by the second heatable resistance thermometer at the point in time $t_2$ is fixed, or a fixed voltage drops at the second resistance thermometer, or a fixed voltage is present at the second resistance thermometer. This is sized independently of the temperature of the measured medium. The heating power is, according to $P=U^2/R$, dependent on the voltage U present or dropping at the resistance thermometer and on the resistance of the resistance thermometer R, which, for its own part, is dependent on the current temperature of the resistance thermometer, which, again, is dependent on the temperature of the measured medium and its curve as a function of time. The second sensor or the second resistance thermometer serves here only for decision making as regards the flow direction. Only with the assistance of the first resistance thermometer is flow measured. This thermometer is heated in a controlled manner and has previously been calibrated in the laboratory. The second resistance thermometer is heated without control.

Another further development provides that the limit value of the decision coefficient for deciding whether the flow is in the first direction or in the second direction is zero, especially if the first coefficient $PC_1(t_1)$ representing the flow of the measured medium through the measuring tube at the point in time $t_1$ is calculated according to the formula $PC_1(t_1)=P_{1,1}(t_1)/(T_{1,heated;actual}(t=t_1)-T_{medium;actual}(t=t_1))$, and if the coefficient $PC_2(t_2)$ representing the flow of the measured medium through the measuring tube at the point in time $t_2$ is calculated according to the formula $PC_2(t_2)=P_{2,2}(t_2)/(T_{2,heated;actual}(t=t_2)-T_{medium;actual}(t=t_2))$, wherein the decision coefficient is then calculated according to the formula $DC=(PC_1-PC_2)/PC_1$, and wherein then the limit value is zero.

The thermal, flow measuring device of the invention is especially used in industrial process measurements technology, in order, for example, to measure gases and/or liquids. In such case, specifications for limiting power, for the example for explosion protection, are often made and can be met.

BRIEF DESCRIPTION OF THE DRAWINGS

The invention will now be explained in greater detail on the basis of the appended drawing, the figures of which, in each case, present an example of an embodiment. Equal elements are provided with equal reference characters in the figures. The figures of the drawing show as follows.

DETAILED DISCUSSION IN CONJUNCTION WITH THE DRAWINGS

Figure 1:
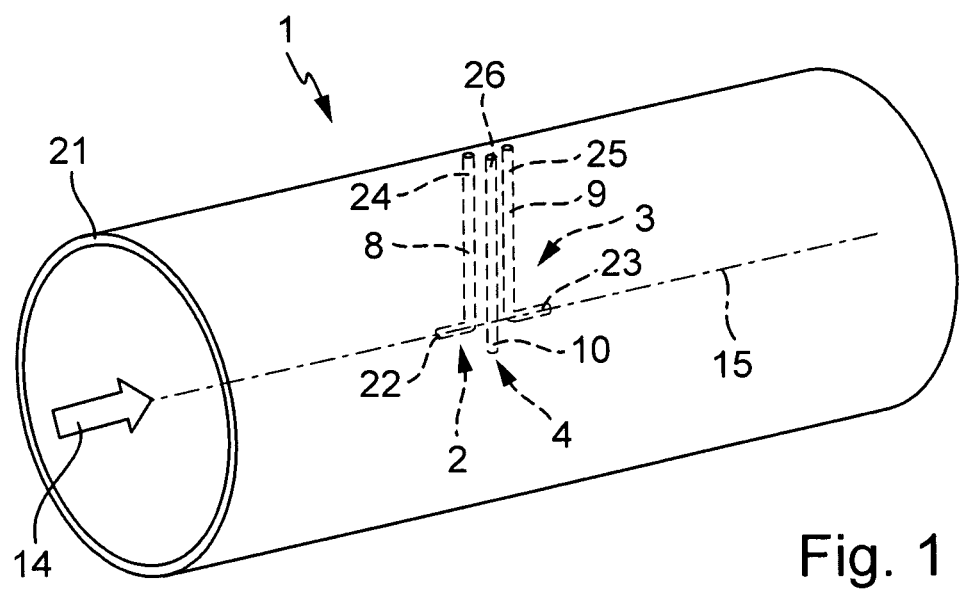
FIG. 1 is a perspective view of, a thermal, flow measuring device of the invention.

FIG. 1 shows a thermal, flow measuring device 1 of the invention in three dimensions. The device includes three sensors 2, 3, 4 in a measuring tube 21, wherein the first sensor 2 has a bent first housing 8, and the second sensor 3 has a bent second housing 9. The third sensor 4 has a pin-shaped housing 10, which is arranged in the measuring tube 21 between the first and the second housing 8, 9. The resistance thermometers (not shown here) are most often-secured inside the housings 8, 9, 10 with so-called thermal bridges or spacers between the housings and the resistance thermometers. The resistance thermometers of the first and second sensors 2, 3 are, according to the invention, embodied heatably, and are installed in the respective housing end sections. The housing shanks 24, 25, 26 lead out of the measuring tube 21, and are affixable in a sensor holder (not shown for reasons of perspicuity). The third sensor 4 measures the temperature of the measured medium.

Figure 3:
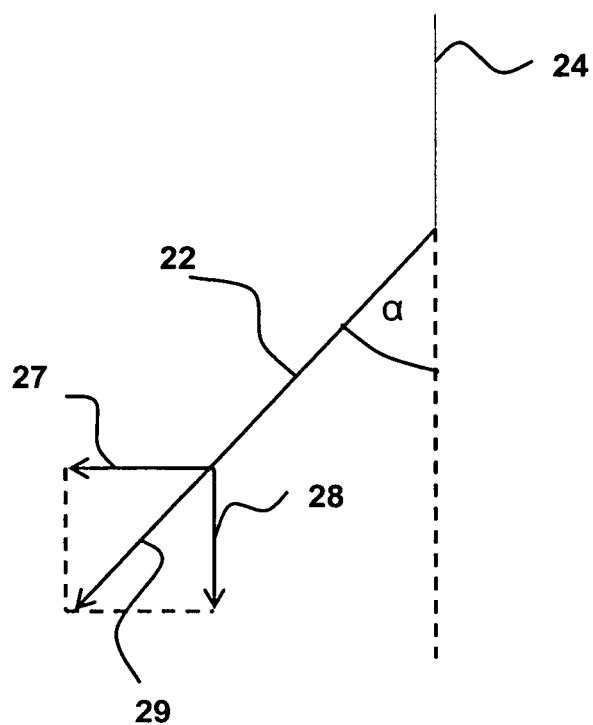
FIG. 3 is a schematic view of the bend of a housing of a sensor of the invention.

Located between the (here pin-shaped) housing shanks 24, 25 and the housing end sections 22, 23 are the bends of the housings 8, 9 of the first and second sensors 2, 3. In this example, these have, in each case, an angle of about 90°. However, the housings are arranged in the measuring tube 21 in such a manner, that the first housing end section 22 (or its central axis) points in a first direction; here, the central axis of the first housing end section 22 runs parallel to the measuring tube axis 15 and points counter to the flow direction 14, and the second housing end section 23 is directed opposite thereto. If the angle of the bend were not 90°, but instead, for example, only 60°, the housing end section would not run exactly parallel to the measuring tube axis and, consequently, would also not be exactly counter to the flow direction; instead, only a directional component, as illustrated in FIG. 3, points in the first direction. Here, the central axes of the housing end sections 8, 9 essentially coincide with the measuring tube axis.

A basic principle in this embodiment is the difference in heat flux between stagnation point and dead water. The first sensor is directly flowed against; the second lies in the lee. The heat flux is higher in the stagnation point than in the lee, and thus the flow-representing coefficient of the first sensor 2 is higher than that of the second sensor 3. This arrangement of the sensors is symmetrical with respect to the measuring tube, which offers the advantage that the thermal, flow measuring device 1 of the invention need only be calibrated in one of the two directions named.

Figure 2:
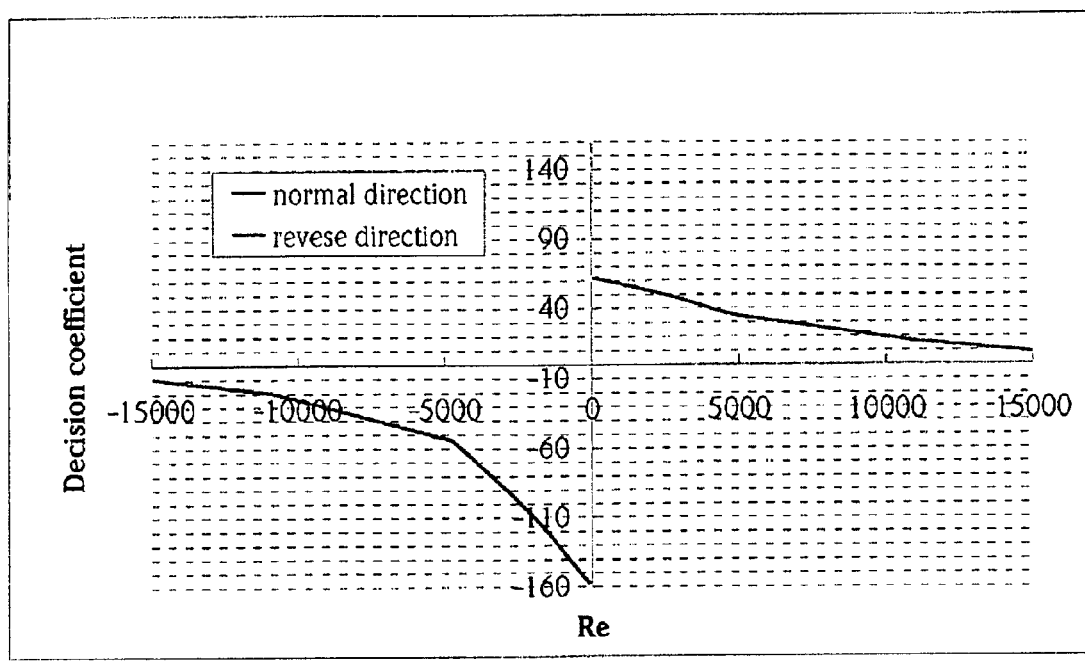
FIG. 2 is a graph of decision coefficient as a function of Reynolds number.

A graph of decision coefficient as a function of Reynolds number is shown in FIG. 2. The faster the flow velocity, the nearer the limit value is to the value zero. In the case of slow flow velocities, the differentiation between the flow directions is clear.

FIG. 3 schematically shows a sensor in terms of its housing 8. The housing shank 24 is perpendicular to the measuring tube axis 15. The bend between the housing shank 24 and housing end section 22 has an angle of about 60°. Thus, the direction 29 in which the housing end section 22 points can be broken down in two directional components. A first directional component 27 runs parallel to the measuring tube axis, a third directional component 28 is perpendicular thereto.

For all embodiments, the method for operating a thermal, flow measuring device of the invention provides method steps as follows.

A first resistance thermometer of a first sensor is heated during a first heating period, it is fed a first amount of heat energy, and the heating power consumed by the first resistance thermometer is ascertained at a first point in time. Additionally, a second resistance thermometer of a second sensor is heated during a second heating period with a second amount of heat energy, and the heating power consumed by the second resistance thermometer is ascertained at a second point in time. A measured value of the temperature of the measured medium in the measuring tube is present both for the first point in time, as well as for the second point in time.

This measured value of temperature of the measured medium can, in alternating operation, be in each case measured by the unheated sensor at the first and second points in time, or a further sensor is provided in the measured medium for determining the temperature of the measured medium at the first and second points in time. In the first case, the first point in time is not equal to the second point in time. In the second case, the second point in time can coincide with the first point in time—the heating powers of the first and second sensor are ascertained at the same point in time.

The first heating power for the first point in time is placed over the difference of the temperature value of the heated first resistance thermometer at the first point in time and the measured value of the temperature of the measured medium at the first point in time. Analogously, the difference of the temperature of the second heated resistance thermometer at the second point in time and the temperature of the measured medium measured at the second point in time is divided into the instantaneous power of the second resistance thermometer at the second point in time. Resulting from this are thus two coefficients for two points in time, which, as indicated above, can, depending on embodiment, be equal to or different from one another.

An essential feature this method lies in the fact that only the first sensor is taken into consideration for flow measurement. The first coefficient is a coefficient reflecting the flow at the first point in time. The first heating power can, for reasons of explosion protection, be limited, e.g. to 256 mW. Naturally, the second heating power is then also correspondingly limited. The first heating power is controlled. Usually, a desired temperature difference between the heated and unheated resistance thermometers is set, e.g. 10K. It is, however, according to $P=U^2/R$, wherein U is the voltage dropping at the resistance thermometer and R is the resistance of the resistance thermometer, also dependent on the resistances of the resistance thermometers, which, for their own part, are again dependent on the temperature. The second heating power is, in contrast, not controlled with regard to a desired temperature difference between second heated resistance thermometer and the corresponding unheated resistance thermometer of the first or third sensor. For example, it is set by a fixed peak voltage or a peak power of a certain size.

By means of the two calculated coefficients, a decision coefficient is formed. The first coefficient is subtracted from the second coefficient and divided by the second coefficient. Naturally, subtraction of the second coefficient from the first coefficient is also possible, wherein the result is then divided by the first coefficient. Depending on the embodiment of the thermal, flow measuring device of the invention used, the limit values then shift, as those skilled in the art will appreciate.

In addition to the volume and/or mass flow, the flow direction of a measured medium in a measuring tube can also be registered therewith.

The invention claimed is:

1. A method for registering flow and flow direction of measured medium in a measuring tube with thermal, flow measuring device comprising:
the method comprising the steps of:
producing measured values representing temperature of the measured medium $T_{medium;actual}(t)$ at points in time $t=t_0, t_1, t_2, t_3, \ldots t_n$, with $n \in N$;
at the point in time $t_1$ a first heating power ($P_1$) is consumed by the first heatable resistance thermometer $P_{1,1}(t_1)$;

at the point in time $t_2$ a second heating power ($P_2$) is consumed by the second heatable resistance thermometer $P_{2,2}(t_2)$;

the first heatable resistance thermometer provides a first measured value of temperature $T_{1,heated;actual}(t=t_1)$ at a point in time $t_1$;

calculating a first coefficient $PC_1(t=t_1)$ representing flow of the measured medium through the measuring tube as a function of the heating power $P_{1,1}(t_1)$ consumed by the first resistance thermometer, the temperature of the measured medium $T_{medium;actual}(t_1)$ and the temperature of the first heatable resistance thermometer $T_{1,heated;actual}(t_1)$;

the second heatable resistance thermometer provides a second measured value of temperature $T_{2,heated;actual}(t=t_2)$ at a point in time $t_2$;

and a second coefficient $PC_2(t=t_2)$ is calculated as a function of the heating power $P_{2,2}(t_2)$ consumed by the second resistance thermometer, the temperature of the measured medium $T_{medium;actual}(t_2)$ and the temperature of the second heatable resistance thermometer $T_{2,heated;actual}(t_2)$;

a value of a decision coefficient is calculated as a function of the first coefficient $PC_1(t_1)$ and the second coefficient $PC_2(t_2)$;

the value of the decision coefficient (DC) indicates a flow of the measured medium in the measuring tube in a first direction when the value of the decision coefficient (DC) lies above a fixed limit value;

the value of the decision coefficient (DC) indicates a flow of the measured medium in the measuring tube in a second direction when the value of the decision coefficient (DC) lies below the fixed limit value; and the second direction is opposite to the first direction.

2. The method as claimed in claim 1, further comprising the step of:

providing the measured value of the temperature of the measured medium $T_{medium;actual}(t_1)$ at the point in time $t_1$ by the second heatable resistance thermometer; and/or providing the measured value of the temperature of the measured medium $T_{medium;actual}(t_2)$ at the point in time $t_2$ by the first heatable resistance thermometer.

3. The method as claimed in claim 1, wherein:

the measured value of the temperature of the measured medium $T_{medium;actual}(t)$ at the points in time t is provided by the third sensor.

4. The method as claimed in claim 1, wherein: $t_1 \neq t_2$.

5. The method as claimed in claim 1, wherein:

$$t_1 = t_2.$$

6. The method as claimed in claim 1, wherein:

the first coefficient $PC_1(t_1)$ representing the flow of the measured medium through the measuring tube at the point in time $t_1$ is calculated according to the formula $PC_1(t_1) = P_{1,1}(t_1)/(T_{1,heated;actual}(t=t_1) - T_{medium;actual}(t=t_1))$; and the coefficient $PC_2(t_2)$ representing the flow of the measured medium through the measuring tube at the point in time $t_2$ is calculated according to the formula $PC_2(t_2) = P_{2,2}(t_2)/(T_{2,heated;actual}(t=t_2) - T_{medium;actual}(t=t_2))$; and the decision coefficient is calculated according to formula $DC = (PC_1 - PC_2)/PC_1$ and the limit value is zero.

7. The method as claimed in claim 1, wherein:

the second heating power $P_{2,2}(t_2)$ consumed by the second heatable resistance thermometer at the point in time $t_2$ is fixed, or that the voltage dropping at the second heatable resistance thermometer is fixed.

* * * * *